Sept. 10, 1957 — E. L. SCHAEFER — 2,805,535
LAWN TRIMMER
Filed Feb. 23, 1954 — 2 Sheets-Sheet 1
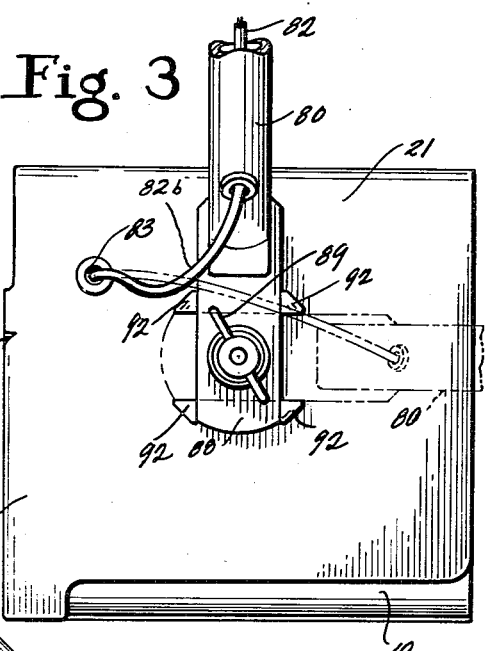
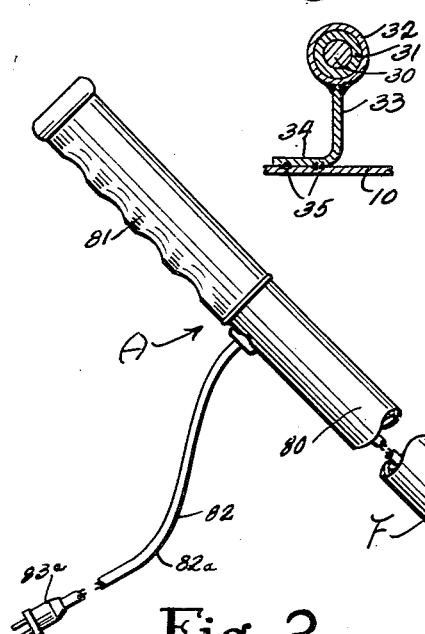
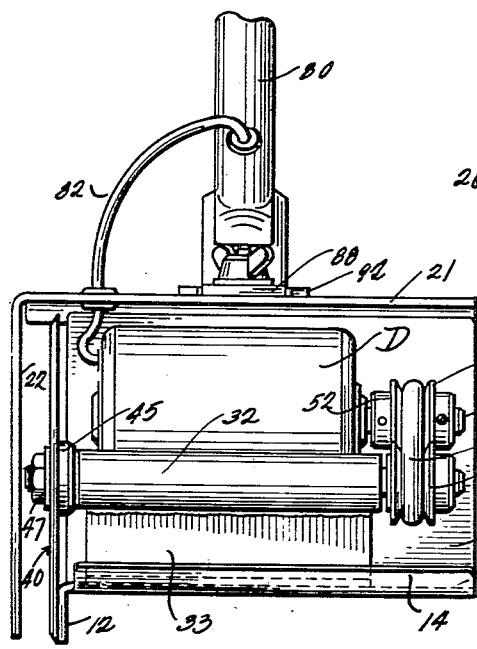
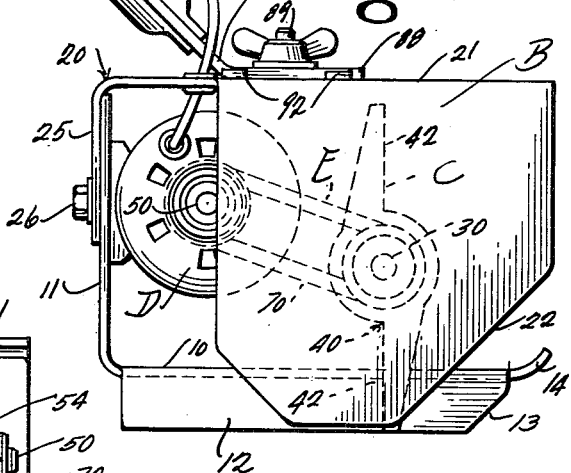
INVENTOR
EDGAR L. SCHAEFER
BY *Lancaster, Allwine & Rommel*
ATTORNEYS Sept. 10, 1957   E. L. SCHAEFER   2,805,535
LAWN TRIMMER
Filed Feb. 23, 1954   2 Sheets-Sheet 2

INVENTOR
EDGAR L. SCHAEFER
BY
ATTORNEYS ent Office 2,805,535
Patented Sept. 10, 1957

2,805,535

LAWN TRIMMER

Edgar Lynn Schaefer, San Antonio, Tex.

Application February 23, 1954, Serial No. 411,863

2 Claims. (Cl. 56—25.4)

This invention relates to improvements in lawn trimmers.

The primary object of this invention is the provision of a relatively compact, sturdy and efficient lawn trimming machine which includes a drive connection yieldable under the imposition of heavy loading to prevent damage to the trimmer, and particularly to relieve undue strain upon the cutter shaft.

A further object of this invention is the provision of a lawn trimmer having an improved means for mounting a rotary cutter and its shaft.

A further object of this invention is the provision of a lawn trimmer having improved handle mounting means thereon.

Other objects and advantages of this invention will be apparent during the course of the following detailed description.

In the accompanying drawings, forming a part of this specification, and wherein similar reference characters designate corresponding parts throughout the several views:

Fig. 1 is a side elevation of the improved lawn trimmer, showing a portion of the handle structure.

Fig. 2 is a front elevation of the lawn trimmer, showing only a portion of the handle structure.

Fig. 3 is a plan view of the lawn trimmer showing only a portion of the handle structure with the motor mounting bolts omitted.

Fig. 7 is an enlarged vertical cross sectional view taken through the shaft and its mounting means substantially on the line 7—7 of Fig. 5.

Figure 4:
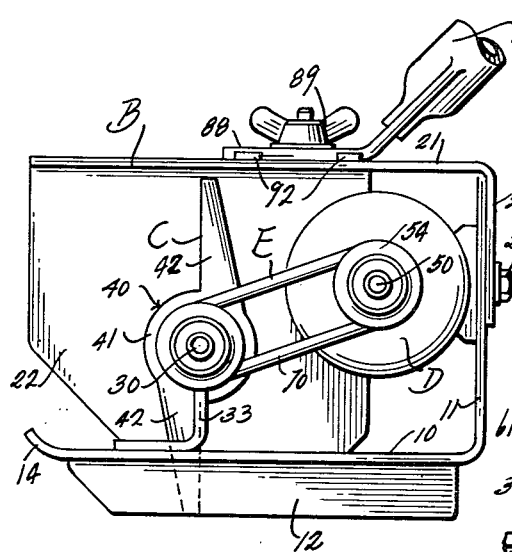
Fig. 4 is a side elevation of the lower portion of the lawn trimmer, directly opposite to the side elevation of Fig. 1.

In the drawings, wherein for the purpose of illustration is mainly shown a preferred embodiment of the invention, with a modification, the letter A may generally designate the lawn trimmer. It includes a frame B, cutter blade and shaft means C, a motor D, a drive connection E between the motor and the cutter blade and shaft construction C, and a handle F.

Referring to the frame B, the same includes a base plate or member 10, normally horizontally positioned, with an upstanding back wall 11. At one marginal edge the base plate 10 has a shear plate or flange 12 depending therefrom against which the cutter blade operates to assist in severing and shearing the grass and sod. The shear plate or flange 12 at its forward edge is sloped at 13, and the base 10 may have an upturned arcuate flange 14 at its forward edge.

The frame structure B also includes a cover assembly 20 consisting of a top plate 21 upon which the handle structure F is mounted. Furthermore, it includes a guard plate 22 which is vertically disposed and integral with one side edge of the top plate 21 and is spaced from the cutter blade structure C. The cover assemblage 20 furthermore includes a rear flange or wall 25 which is bolted to the wall plate 11 by bolts 26; the latter also functioning to bolt the motor D to the wall 11 of the frame.

The cutter blade and shaft assemblage C preferably comprises a horizontal shaft 30 mounted in ring shaped bronze bearings 31. The latter are pressed into a shaft receiving tube 32. The latter is mounted upon a flexible support, plate or flange 33 having a lower horizontal flange 34 spot welded at 35 upon the top of the base plate 10, as shown in detail in Fig. 7.

This mounting means for the shaft enables the shaft to move towards the motor upon contact of the cutter blade structure with some solid object, for the purpose of relieving strain upon the mounting means and driving connections for the cutter blade.

The cutter blade structure 40 includes a hub 41 and a pair of cutter blades 42 radially extending therefrom, although the number may vary as desired. The hub 41 is mounted upon an end of the shaft 30, against a washer or flange 45; the end of the shaft 30 being screw threaded to receive a nut and washer structure 47 for the mounting and clamping of the blade structure upon the shaft 30 for rotation therewith. The shaft 30 and the blade structure 40 are so mounted that the blades 42 operate against the shear plate 12 for cutting action upon sod, grass, etc.

The motor D is mounted upon the frame walls 11 and 25, being bolted thereto by the bolts 26, spaced above the base plate 10. It has a drive shaft 50 located on an axis spaced farther from the base plate 10 than the axis of the shaft 30, as will be noted from the drawings.

Referring to the drive connection between the shafts 30 and 50, the latter is provided with a split pulley structure consisting of one part 52 keyed to the shaft 50 by a screw 53. Its pulley face is tapered. The shaft 50 is provided with a complementary pulley part 54 manually adjustably connected to the shaft 50 for movement towards and away from the pulley part 52. It is keyed to the shaft 50 by a set screw 55. The groove of the pulley can thus be manually widened or contracted, as desired, for belt adjustment purposes.

The shaft 30 at its end opposite the cutter blade is screw threaded at 60 and has a pulley 61 screw threaded and keyed thereto. The groove 62 of the pulley 60 may be of constant width.

The drive connection includes an elastic drive belt 70, preferably round in cross section. It will stretch under heavy loads. It is trained about the pulleys of the motor shaft 50 and the cutter blade shaft 30, as shown in the drawings. The pulley structure on the drive shaft of the motor is adjusted to suit the effective belt length. Under heavy loading, during operation of the trimmer, the belt 70 will tighten and stretch and slow down the drive of the cutter blade, and at the same time there will be a deflection of the cutter blade shaft mount 33, similar to that shown in dot and dash line position in Fig. 6. All of this will relieve bending and stressing action upon the cutter assemblage, and in particular upon the shaft 30.

Referring to the handle assemblage F, the same preferably includes an elongated tubular handle 80 having a grip 81 which may be of insulation. An electrical conducting cable 82 is positioned in the passageway of the handle 80 having an upper exit end 82$^a$ with a plug 83$^a$. The lower end 82$^b$ exits from an opening adjacent to the frame structure and extends through an opening 83 in the top plate of the frame, and is connected to the motor D.

The handle F at its lower end is provided with a flat extension 87 and an angled attached plate 88. The latter is bolted detachably and adjustably by a wing bolt and nut structure 89 so the handle F may be swung from the normal position shown in Fig. 2 to 90° positions at each side, as shown in the dot and dash line position in Fig. 3. Stabilizing and position fixing lugs 92 are fixed upon the top plate 21 to aid in definite clamping position of the handle with respect to the frame B, as shown in Figs. 1 and 3.

Figure 8:
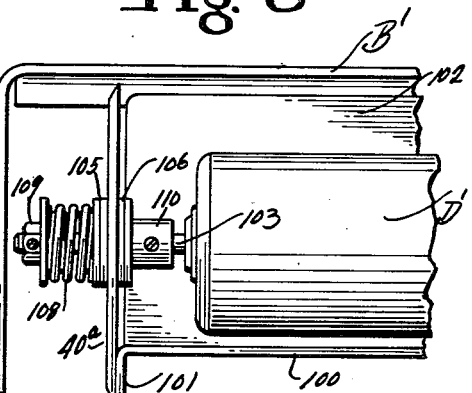
Fig. 8 is a fragmentary front elevational view of a modified form of mounting the cutter upon a motor drive shaft.

In the modified form of structure shown in Fig. 8, the frame B' includes a base plate 100, having a shear flange 101 thereon and a rear wall structure 102 upon which the motor D' is mounted. The motor D' includes a drive shaft 103. The blade structure 40$^a$ is clamped for drive connection upon the shaft 103 between clutching type metal impregnated asbestos washers 105 and 106. The washer 105 is spring urged by a compressed spring 108. The latter being so held by washer and nut structure 109 connected to the shaft 103. There is a hub and flange 110 keyed to the shaft 103 and the spring urges the cutter blade 40$^a$ into clutched relation between the washers 105 and 106 for rotation with the shaft 103. Should the blade 40$^a$ hit a solid object it will slip between the washers 105 and 106 to relieve strain upon the motor shaft and other drive connection.

Figure 6:
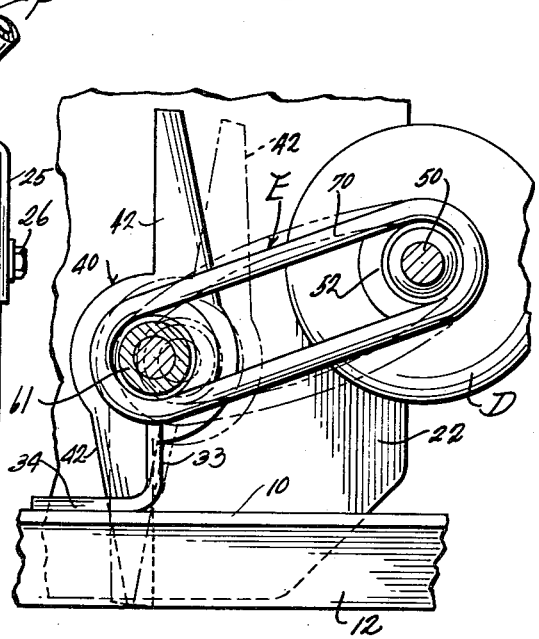
Fig. 6 is an enlarged fragmentary view, parly in section, of the drive connection between the cutter shaft and drive shaft, and particularly showing in dot and dash lines a flexed position of the cutter shaft for relieving strain thereupon and upon all of the drive connections, when the cutter strikes some solid object.
Figure 5:
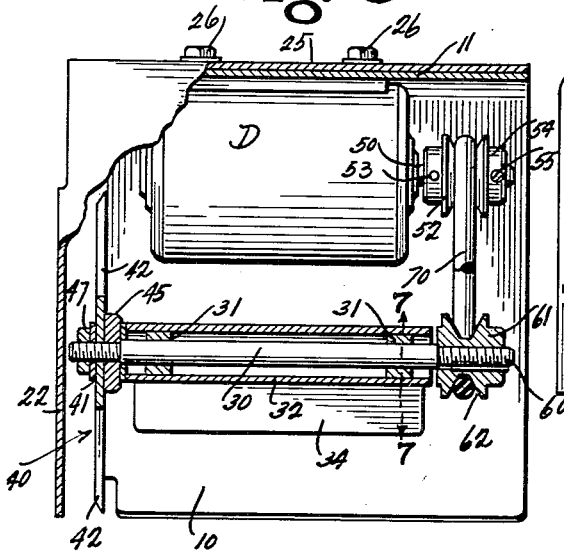
Fig. 5 is a fragmentary plan view, with parts broken away and shown, partly in section, showing the frame, motor and cutter shaft mount, with its driving connection to the motor.

During operation the belt will pull taut, due to centrifugal action, for anti-slip normal driving of the driven shaft from the drive shaft, as is obvious from Fig. 6.

Various changes in the shape, size and arrangement of parts, may be made to the form of invention herein shown and described, without departing from the spirit of the invention or scope of the claims.

What is claimed is:

1. In a lawn trimmer the combination of a portable supporting frame, a motor mounted on the frame which has a horizontal drive shaft, a driven shaft, a cutter blade keyed upon the driven shaft, a mounting support carried by the frame rotatably supporting thereon the driven shaft in horizontal closely paralleled relation with respect to the drive shaft, said mounting support being flexible so it will yield under the imposition of a heavy loading force whereby to permit the driven shaft to move towards the drive shaft and subsequently return to normal position without destruction of said yieldable mounting means or other parts of the trimmer, a pulley keyed on each of the drive and driven shafts, each having a tapered belt receiving groove therein, and a short flexible belt of friction providing material trained over and around the grooves of said pulleys for the driving of said driven shaft.

2. In a lawn trimmer the combination of a portable supporting frame, a motor mounted upon the frame having a drive shaft, a driven shaft, a cutter blade keyed upon the driven shaft, a plate mounted upon said frame which is transversely flexible and rotatably supports the driven shaft in close proximity to the drive shaft so that the plate may flex in order that the driven shaft will move towards or away from the drive shaft, pulleys keyed upon the drive and driven shafts, and a short endless flexible belt trained upon said pulleys and connecting the drive and driven shafts for rotation of the driven shaft off of said drive shaft, whereby the plate will flex under the imposition of heavy loading upon the motor.

References Cited in the file of this patent

UNITED STATES PATENTS

| | | |
|---|---|---|
| 2,403,236 | Phelps | July 2, 1946 |
| 2,478,813 | Esleck | Aug. 9, 1949 |
| 2,480,944 | Malpas | Sept. 6, 1949 |
| 2,483,683 | Wells et al. | Oct. 4, 1949 |
| 2,514,278 | Dunn et al. | July 4, 1950 |
| 2,521,033 | Bell | Sept. 5, 1950 |
| 2,538,230 | Boggs | Jan. 16, 1951 |
| 2,612,741 | McKay | Oct. 7, 1952 |
| 2,621,463 | Skillman | Dec. 16, 1952 |
| 2,630,747 | Mintz | Mar. 10, 1953 |
| 2,718,743 | Smith et al. | Sept. 27, 1955 |
| 2,719,398 | Hutchens | Oct. 4, 1955 |
| 2,719,400 | Lesesne | Oct. 4, 1955 |
| 2,721,433 | Berdan | Oct. 25, 1955 |